(No Model.)

S. I. HASELTINE.
HAND WEEDER AND SCRAPER.

No. 261,707.           Patented July 25, 1882.

Witnesses:
J. W. Reynolds Jr.
G. A. Haseltine

Inventor.
Spurzheim I. Haseltine
per Seward A. Haseltine
Attorney.

United States Patent Office.

SPURZHEIM I. HASELTINE, OF DORCHESTER, MISSOURI.

HAND WEEDER AND SCRAPER.

SPECIFICATION forming part of Letters Patent No. 261,707, dated July 25, 1882.

Application filed June 8, 1882. (No model.)

*To all whom it may concern:*

Be it known that I, SPURZHEIM I. HASELTINE, a citizen of the United States, residing at Dorchester, in the county of Greene and State of Missouri, have invented certain new and useful Improvements in Garden-Tools, or Hand Weeder and Scraper; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in garden-tools, the object of which is to provide an easy, convenient, and rapid means of removing the grass and weeds from between and around cotton, onion, and other small plants usually weeded by hand, and which stand close together in the row. I attain these objects by the device illustrated in the accompanying drawings, in which—

Figure 1:
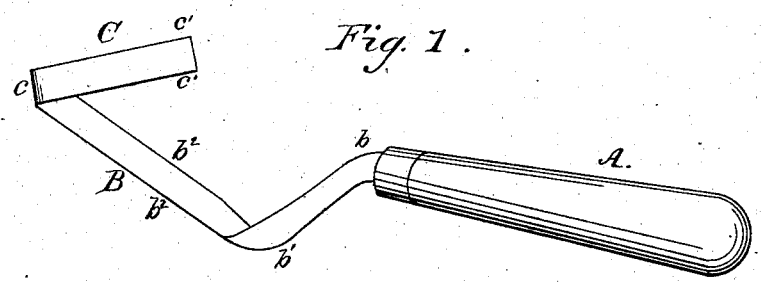
Figure 2:
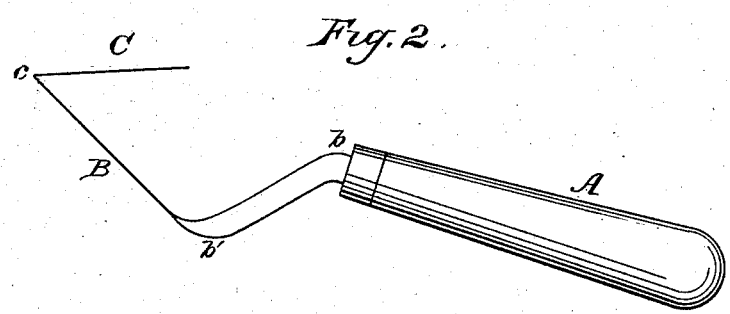

Figure 1 is a perspective view, and Fig. 2 an edge view, of the entire tool.

The device consists of the handle A and an extended metallic rod bent at an oblique angle at $b$ and at $b'$, from which point it is flattened into a blade, sharp on either side, $b^2$ $b^2$ and $c'$ $c'$, and level on the upper side of the extended part B, and on the under side of the returning part C it is bent at an acute angle at $c$, a point nearly and best directly in a line with the handle. It may be sharpened on either or both sides for the convenience of a left or right hand person. It is used as a knife for cutting grass and weeds either above or below the surface of the ground, the extending part B to be used on the side of the row of plants next to the hand in which the tool is held, the returning part C, as shown, for cutting and removing in a similar way the weeds on the opposite side of the row from the hand using the tool; and herein is one of the great advantages of the returning part of the blade, (its returning without coming back to the handle C, as shown,) as by the inversion of the instrument the weeds can be cut close to the plants without fear of injury, and the angle at $c$, being an acute angle, enables the use of the knife as a hook for removing weeds in the row where the plants are very thick, and in this consists the second important advantage of my invention.

I am aware that it is not new in hand weeders and scrapers to construct a blade that extends from and returns to the handle, or a blade that is parallel with and also at right angles with the handle. I do not therefore claim such construction, broadly; but What I do claim as my invention, and desire to secure by Letters Patent, is—

1. A hand weeder and scraper composed of a handle, and a blade, B C, set off therefrom, the blade extending at an angle with the line of the handle and turning back upon itself at an acute angle, substantially as shown and described.

2. An improved hand weeder and scraper, composed of a handle, A, and a sharp cutting-blade, B C, set off therefrom, the extending part of the blade B having the cutting-edges $b^2$ $b^2$ in a line at an angle with the line of the handle, and turning back upon itself at an acute angle, $c$, and a returning cutting-blade, C, having cutting-edges $c'$ $c'$, substantially as herein shown and described.

3. An improved hand weeder and scraper composed of a handle, A, and a blade, B C, having the cutting-edges $b^2$ $b^2$ $c'$ $c'$, the extending part of the blade B making an acute angle with the line of the handle, and at a point, $c$, being in a line with the line of the handle, turning back upon itself at an acute angle and forming the returning blade C, substantially as shown and described.

In testimony whereof I affix my signature in presence of two witnesses.

SPURZHEIM I. HASELTINE.

Witnesses:
O. H. BARKER,
JOE J. MASSEY.